United States Patent [19]

Haines et al.

[11] Patent Number: 4,932,299
[45] Date of Patent: Jun. 12, 1990

[54] APPARATUS FOR CUTTING LENGTHS OF ELONGATED MATERIAL

[75] Inventors: Arthur A. Haines, Hudson; Peter G. Doyon, Manchester, both of N.H.

[73] Assignee: Schleuniger USA Inc., Manchester, N.H.

[21] Appl. No.: 364,380

[22] Filed: Jun. 12, 1989

[51] Int. Cl.$^5$ ............................................. B26D 1/08
[52] U.S. Cl. ...................................... 83/436; 83/447; 83/444; 83/443
[58] Field of Search ................. 83/436, 259, 444, 446, 83/447, 449, 450

[56] References Cited

U.S. PATENT DOCUMENTS

| 4,176,570 | 12/1979 | Hutchins | 83/447 |
| 4,257,295 | 3/1981 | Patel | 83/208 |
| 4,301,700 | 11/1981 | Greven | 83/444 |

Primary Examiner—Hien H. Phan
Assistant Examiner—Hwei-Siu Payer
Attorney, Agent, or Firm—Cushman, Darby & Cushman

[57] ABSTRACT

An apparatus for cutting lengths of elongated material such as cables and wires is provided. The apparatus includes a main frame structure, a cutting blade supported on the main frame and adapted to cut the elongated material, a material feed path extending between an entrance of the apparatus and the cutting blade and at least one roll supported on the frame and spaced a first distance from the feed path. A mechanism is provided for varying the distance between the roll and the feed path. A guiding shoe is further provided for guiding the elongated material between the roll and the cutting blade with respect to the feed path. The guiding shoe has at least one guide surface in the vicinity of the roll and the cutting blade. The guide surface is spaced from the feed path by a distance which is larger than the first distance at any time. A mechanism is also provided for varying the spacing of the guide shoe from the feed path.

13 Claims, 2 Drawing Sheets

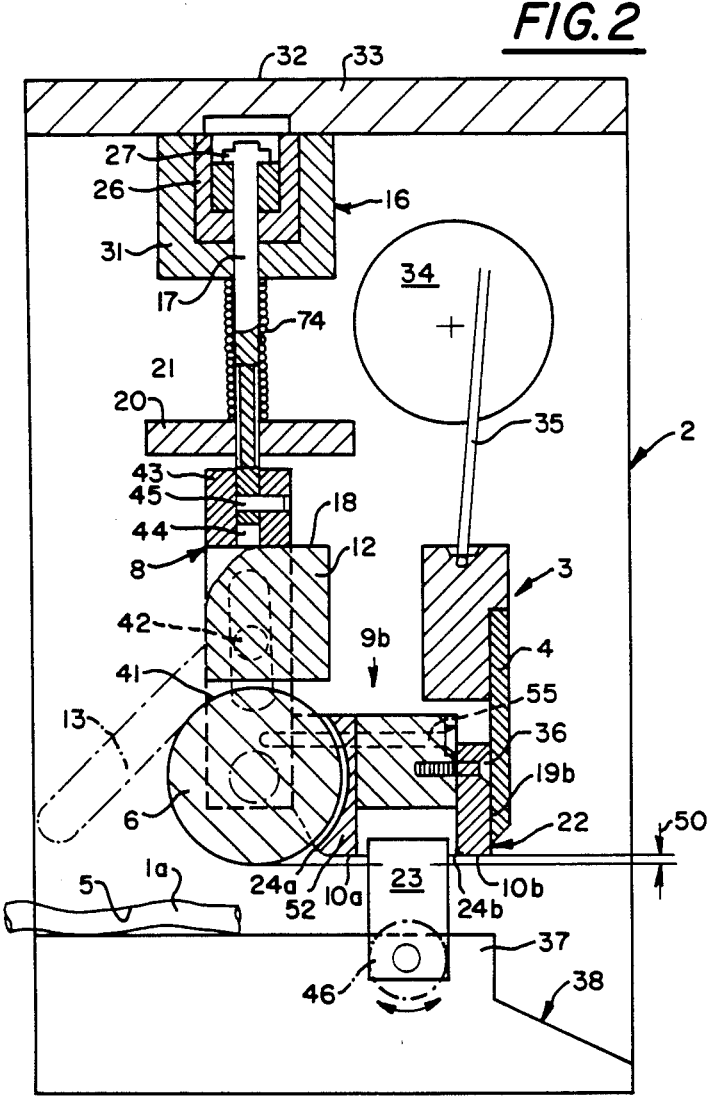
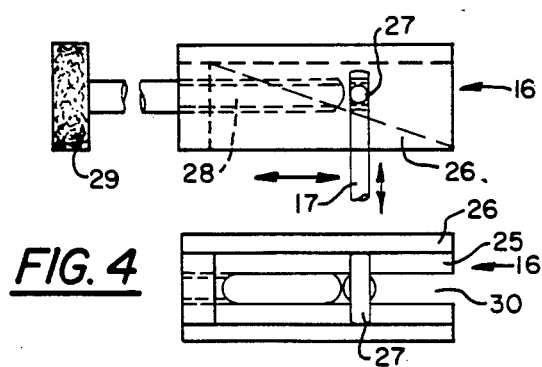
FIG. 2
FIG. 3
FIG. 4

APPARATUS FOR CUTTING LENGTHS OF ELONGATED MATERIAL

BACKGROUND OF THE INVENTION

1. Field of the Invention

The present invention relates to cutting lengths of a material and, in particular, to feeding and guiding means for a cutting apparatus.

2. Description of the Related Art

A known cutting apparatus which is available in the market is disclosed in U.S. Pat. No. 4,257,295 issued Mar. 24, 1981. The disclosure of that U.S. Patent is incorporated herein by this reference.

A problem arises with this known apparatus if one feeds in a new elongated material to be cut. Indeed, in order to feed such a new elongated material, the operator has to pull a knob with one hand and must push the elongated material with the other hand into the inlet side of the apparatus toward the outlet side where the cutting blade is mounted. Thus, the operator will have no free hands while feeding the elongated material and, therefore, will be unable to do any other manipulations such as move the cutting mechanism. As a result, the feeding procedure is quite difficult and time consuming and may be dangerous to the operator. In addition, in some cases the inserted material is not stiff enough to be pushed straight forward. Thus, the inserted material can curl between the roll and the cutting mechanism. In such cases the machine may jam.

This results in a time consuming-readjustment as well as refeeding the material. If the machine is watched constantly, the foregoing is a minor problem. However, if the machine is not monitored for a period of time, quite a few meters of elongated material can be stuck jammed the feed rolling mechanism and the cutting mechanism. In such a case, the material and the mechanical parts of the apparatus can be damaged. Further, to remove the curled part of the material, tools are necessary and, in some cases, a very time consuming repair is required.

Other apparatus known in the art are however extremely limited as to the materials and shapes and are not entirely satisfactory for cutting operations. The present invention solves the above mentioned problem by providing new guiding means for guiding the material between the feed roller mechanism and the cutting mechanism and by providing new means for lifting the feed roller mechanism in a manner which allows an operator to use both his hands for other manipulations on or in the apparatus.

The unique isolated adjustment device for a very fine adjustment of the gap within the feed roller mechanism is also disclosed. This isolation from the lifting device avoids possible unwanted adjustments during a simple raise operation of the feed roller mechanism.

SUMMARY OF THE INVENTION

The present invention is more specifically concerned with the provision of a new design feeding and guiding mechanisms for: a cutting apparatus which allows the cutting of different kinds of elongated materials, especially cables and the like, which is accurate and safe in operation, limiting curling of the material during the feeding operation, and lessening the possibility of material jams in the cutting mechanism.

It is a further object of the herein disclosed invention to provide a unique system for lifting and locking said feed roller mechanism in the full open position without occupying an operators hand for the time the feed roller mechanism is raised.

It is a further object of the invention to provide a new and unique adjustment mechanism for the adjustment of the feeding height between the feeding roll mechanism and a feeding path for the material to be cut, and improved visual indication of that adjustment.

A still further object is to provide an integrated guiding complex between the feed roller mechanism and the cutting mechanism which guides the elongated material with respect to its movement up and down and to its movement left and right relative to the direction of the feeding path respectively the middle axis of the feeding path for said material.

All measures and features provided in this invention result either in more accurate cuts even of very pressure sensitive materials and in a very easy handling mode of the entire feeding and cutting mechanism.

Further objects of the invention will be brought out in the following part of the specification wherein detailed description is for the purpose of fully disclosing the invention without placing limitations thereon. Most of the parts of the entire apparatus are either known by a man skilled in the art or disclosed in the above mentioned U.S. patent. Therefore, the following description is directed more specifically to the new and unique parts of the apparatus.

BRIEF DESCRIPTION OF THE DRAWINGS

Referring to the accompanying drawings, which are for illustrative and not for restrictive purposes:

FIG. 2 shows a similar apparatus in cross-sectional side view; different to the embodiment of FIG. 1 is a different guide means; further different to the embodiment of FIG. 1 the position of the feed roller mechanism is in the open (nonoperating) position;

FIG. 3 is a front view of a wedge means part which is responsible for the adjustment of the feed roller mechanism, with respect to a feeding path; and FIG. 4 is a top view of the part referred in FIG. 3.

DESCRIPTION OF THE PREFERRED EMBODIMENT

Figure 1:
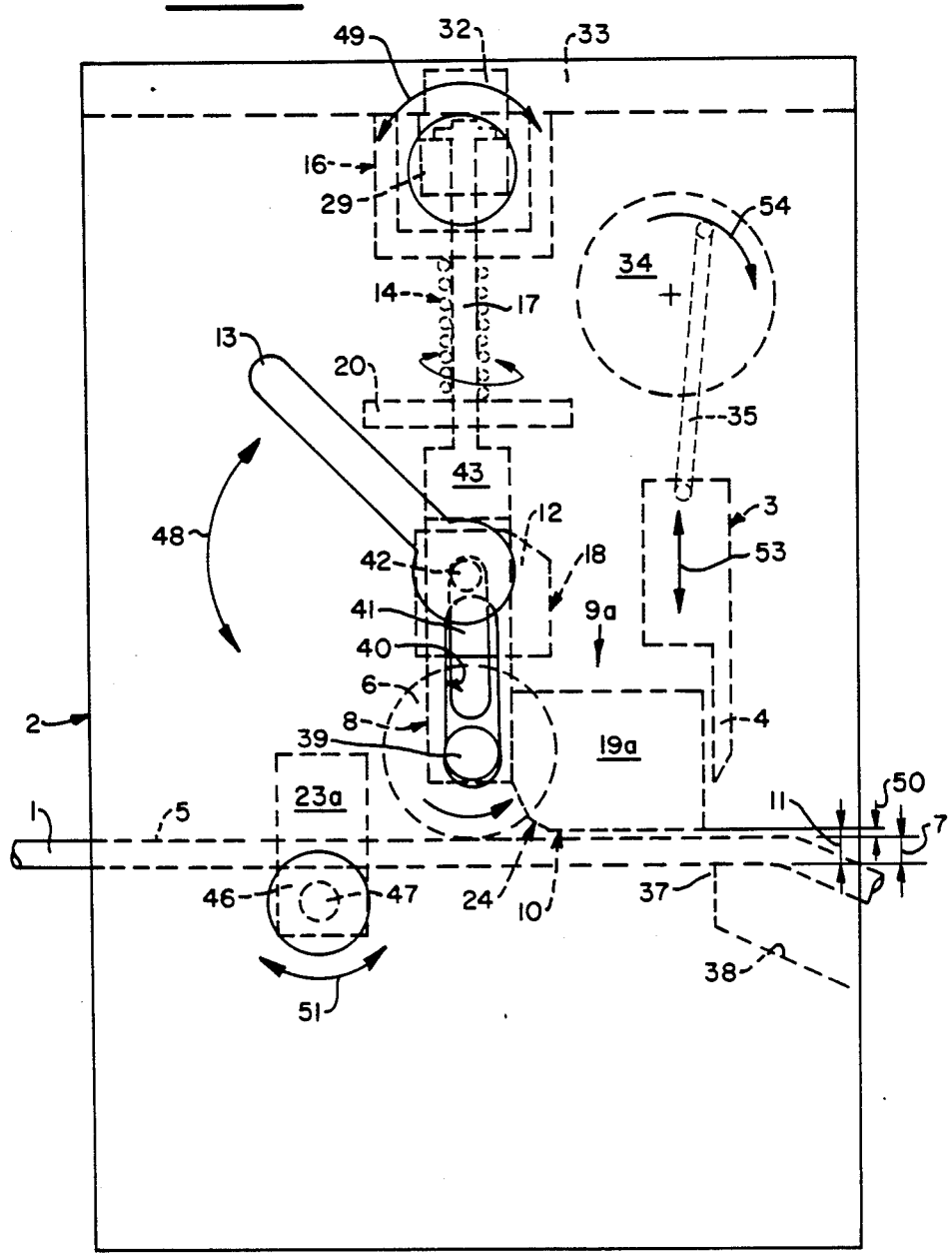
FIG. 1 is a side view of a new apparatus with the most important grip parts; dotted lines indicate the important parts inside the apparatus; the feed roller mechanism is in a closed (operating) position.

Referring now more specifically to the drawings it is stated that the same parts are indicated with the same numeral references and similar parts have the same numbers but different indexes. The present invention as disclosed in FIG. 1 is incorporated in a main frame structure (2) which is closed partly and thus at the same time a housing for the apparatus. It contains a feeding path (5) for supporting an elongated material (1) to be cut;

a cutting head (3) with a blade (4) attached hereto;

a hold down guiding shoe (9a) with a support (19a) and a guiding surface (10) on its lower most side;

a feed roller (6) mounted on a yoke (8);

and lateral guide plates (23a) for centering the elongated material (1) with respect to the lateral edges of the feeding roller (6) respectively with respect to the middle axis of the feeding path.

The cutting head (3) is slidably mounted in the main frame structure either on rails, rods or in any known manner and drivingly connected to a drive, for example an eccentric wheel (34) as shown. The connection is a connecting rod (35) which is joined to the cutting head and to the eccentric wheel (34). The eccentric wheel (34) is rotated in the direction of the arrow (54) by an electric motor not shown. However, the drive for the cutting head (3) could be of any other system known in the art. Stop means are provided to allow exact cutting operations and to avoid cutting steps during the time of feeding the elongated material (1).

Said hold down guiding shoe (9a) is rigidly connected with a screw (55) to the yoke (8) which bears an axle (39) of said feed roller (6). The edge (24) of said surface (10) in the vicinity of said roller (6) is round shaped or slightly wedge shaped. During the feeding operation this makes it easier to feed an elongated material between the guide surfaces (10) and the feeding path (5). Especially soft elongated materials tend to curl upward or downward after they passed a feeding roll as shown at (1a). Such curling effects lessened due to the invention since the round shaped edge (24) and the guiding surface (10) catches the end of the elongated material very close behind the roller (6). This effect is even better since the distance (7) between the lower most part of the roller (6) and the feeding path (5) is shorter than the distance (11) between the guiding surface (10) and said feeding path (5). This difference (50) may vary according to different materials to be fed and cut. To vary this distance (50) it is necessary to vary the position of the guiding shoe (9a) with respect to support (19a) on the yoke (8). Provided the connection between the guiding shoe (9b) and the support (19b) is made with screws (36) (see FIG. 2) such an adjustment can be performed if the guiding support (19b) has slotted holes to allow a relative movement between the support (19b) and the guiding shoe (9b) with respect to the screws (36).

The two lateral guiding plates (23a) are known in the art and controlled by a screw (47) with two opposite threads for cooperation with threads in bores of the two plates. The screw is connected to a knob (46). The knob (46) is rotatable in the direction of the arrow (51). Whenever an operator turns the knob (46) in one direction both lateral guide plates (23a) move symmetrically towards the center line (middle axis) of the feeding path (5), and if he turns the knob in the opposite direction the plates (23a) move symmetrically apart from said center line.

Since there is only one feeding roller (6) shown it must be emphasized that there could be a second feeding roller on the opposite side of the first feeding roller. Both rollers could be drivingly connected as known in the state of the art. However, feeding rollers could also be substituted with feeding belts or any other means known in the art, for example pneumatic grips or the like. However, in any case, it is desirable that the hold down shoe (9a) remains in its relative position to the feeding means as shown in the drawing. If the feeding path (5) has a very smooth or slippery surface with respect to the elongated material second rollers or the like are not necessary.

The yoke (8) is guided within the main frame structure along with the axle (39) of the roller (6) which penetrates a slot (40) in each side wall of the main frame structure (2). However, more guiding means could be provided like slides or the like. Each of the two lateral arms of the yoke also has a vertical slot (41). Said slots (41) guide an axle (42) of a cam (12) which is placed between the roller (6) and the lower most side of the connecting bar (43) of the yoke (8). In FIG. 1 the cam is shown in a closed position. Thus, yoke (8) and the roller (6) are in their lower most position with respect to the axle (42) of the cam (12). To change this position a handle (13) which is rigidly connected to the axle (42) of said cam (12) has to be swiveled downward according to the arrow (48). If it is swiveled about 90 degrees it raises with its cam surface, the bar (43) and thus the yoke (8) (see FIG. 2). In the raised position of the handle (13) and the cam (12), a flat rest surface (18) secures the yoke in the raised position because of its self inhibiting effect with respect to the lower most side of the bar (43). Since the axle (42) of the cam is rotatably beared in a bore of the main frame structure (2) on each side, the axles of the cam (12) remains in its relative position to the feeding path (5). To allow the yoke being lifted, slots (41) in its vertical arms are provided, as mentioned above.

On its upper end, the yoke (8) is rigidly connected to a rod (17) (see FIG. 2), the rod (17) is inserted in a bore (44) of the bar (43) and secured to it by a bolt or a screw (45).

Just above the bar (43), the rod (17) provides a thread (21). A nut (20) is rotatably attached to said thread. Said nut (20) is within the housing respectively within the main frame structure (2) but in reachable position for an operators hand. The function of the nut (20) is to carry a spring (14) on the rod (17) and to press the spring (14) against an u-shaped holder (31) of Wedge means (16). Adjustment of the nut (20) results in an adjustment of the spring compression respectively the spring force. This holder (31) is rigidly attached to an upper plate (33) of the main frame structure (2). The holder (31) has a bore for the rod (17). The upper plate (33) has also a bore (32) to allow a certain movement of the rod (17) even within the upper plate (33). A guide pin (27) is provided on the upper end of the rod (17). Between this guide pin (27) and the lower bar of the u-shaped holder (31) is a wedge arrangement which will be understood more clearly by referring to FIG. 3 and 4. However, the guide pin (27) rests in the closed position of the cam (12) (FIG. 1) on the slope of the wedge (26). Guide pin (27) travels up or down dependent on the turning of screw (28), which is in a fixed position relative to the main frame structure (2) attached to the movable wedge (26).

Since the spring (14) presses the nut (20) and therewith the rod (17) in its lower most position the increasing or decreasing of height of the wedge (26) results in a very fine adjustment of the roller (6) with respect to the feeding path (5). The screw (28) penetrates the side wall of the main frame structure (2) and a knob (29) is attached thereto and rotatable as shown by arrow (49) to allow an operator to adjust the wedge (26) thus adjusting the position of the roller (6) together with the position of the hold down shoe (9a) with respect to the feeding path (5). This adjustment is not connected to the lifting possibilities of the cam (12) which remain always the same.

On the other side if the cam (12) raises the yoke (8) in its upper most position, the wedge arrangement looses its function. As it can be clearly seen in FIG. 2. To enable the rod (17) to penetrate permanently the wedge 26, an elongated slot (30) is provided. Thus the wedge (26) is fork shaped.

The lateral guide plates (23) of FIG. 2 are transferred to the place in between the roller (6) and the cutting blade (4). To allow this, the hold down shoe (9b) of FIG. 2 has two parts (19b) and (52). Both have a guiding surface (10b) and (10a) respectively with round shaped edges (24a), (24b) on their side facing the roller (6). A screw (55) is indicated which secures both parts (52) and (19b) rigidly to the yoke (8). The resulting space between the two parts (19b) and (52) allows a free movement of the lateral guiding plates (23) independently of the position of the hold down shoe (9b). The hold down shoe (9b) of FIG. 2 has an outer surface (22) which is close to the blade (4) to allow the blade (4) to slide along the surface (22). The feeding path (5) ends in an anvil section (37) which cooperates with the blade (4) and a slope (38) for the cut materials.

From the foregoing description and the description of the mentioned U.S. patent it is believed that it will be appreciated that the heretofore outlined objects of the invention will be attained and that the apparatus embodiing the descripted figure provides inherent advantages over the prior known devices for cutting material.

Various modifications may suggest themselves to those skilled in the art without departing from the spirit of the disclosed invention and hence it is not desired to be retreated to the specific shown form of uses mentioned except to the extent indicated in the claims.

We claim:

1. Apparatus for cutting lengths of elongated material, comprising:
    a main frame structure;
    cutting means including a cutting blade supported on said main frame structure adapted to cut elongated material;
    means for feeding said elongated material from an apparatus entrance towards said cutting means including a material feeding path and at least one roll supported on said main frame structure spaced a first distance from said feeding path;
    means for varying said first distance of said roll relative to said feeding path including a yoke means;
    guiding means for guiding said material between said roll and said cutting blade with respect to said feeding path;
    said guiding means having at least one guiding surface in the vicinity of said roll and said cutting means;
    said guiding surface being spaced a second distance from said feeding path which is at any time bigger than said first distance; and
    means for varying said second distance
    said guiding means being rigidly connected to said yoke, whereby said means for varying said first distance also performs the function of varying said second distance.

2. Apparatus of claim 1, wherein said means for varying said first distance include a cam means with a handle attached thereto, said cam being rotatably attached to said main frame structure and being adapted to raise and lower the yoke (8) relative to said feeding path.

3. Apparatus of claim 2, wherein said means for varying said first distance include a spring with a force adjusting means.

4. Apparatus of claim 3, wherein said spring force urges said yoke toward said feeding path.

5. Apparatus of claim 1, wherein said means for varying said first distance comprise:
    a wedge means;
    a yoke, slidably guided on said main frame structure;
    said yoke bearing said roll;
    a cam with a handle;
    said cam being adapted to lift or reset said yoke with respect to said feeding path;
    said handle being outside said main frame structure;
    connecting means between said yoke means and said wedge means for transmitting an adjustment from said wedge means to said yoke means and to alter said first distance;
    spring means for urging said yoke means in its lowermost position with respect to an adjustment position of said wedge means.

6. Apparatus of claim 5, wherein said cam includes at least one flat rest surface for a self inhibiting set at an open position of said roll.

7. Apparatus of claim 5 further comprising a spring force adjustment means including a nut and a thread on said connecting means, said nut bearing the lowermost end of said spring and being screwable on said thread.

8. Apparatus of claim 6 further comprising a spring force adjustment means including a nut and a thread on said connecting means, said nut bearing the lowermost end of said spring and being screwable on said thread.

9. Apparatus of claim 1, wherein said guiding means has a surface parallel to said blade and said blade slides along said surface during cutting operations.

10. Apparatus of claim 1, wherein said guiding means has only one guide surface parallel to said feeding path and extending from the vicinity of said roll to the vicinity of said cutting means.

11. Apparatus of claim 1, wherein said guide means has at least two guide surfaces, a first guide surface provided close to the vicinity of said roll and a second guide surface provided close to the vicinity of said cutter means, and further comprising:
    further guide means for centering said elongated material with respect to both lateral ends of said roll;
    said further guide means being arranged in between said first and second guide surfaces.

12. Apparatus of claim 1, wherein an edge of said guiding surface in the vicinity of said roll is round shaped.

13. Apparatus of claim 12, wherein edges of said first guide surface and said second guide surface facing said roll are round shaped.

* * * * *